Oct. 21, 1930.    P. A. BENEDICT    1,778,788
TRUNK RACK GUARD
Filed July 22, 1929        2 Sheets-Sheet 2

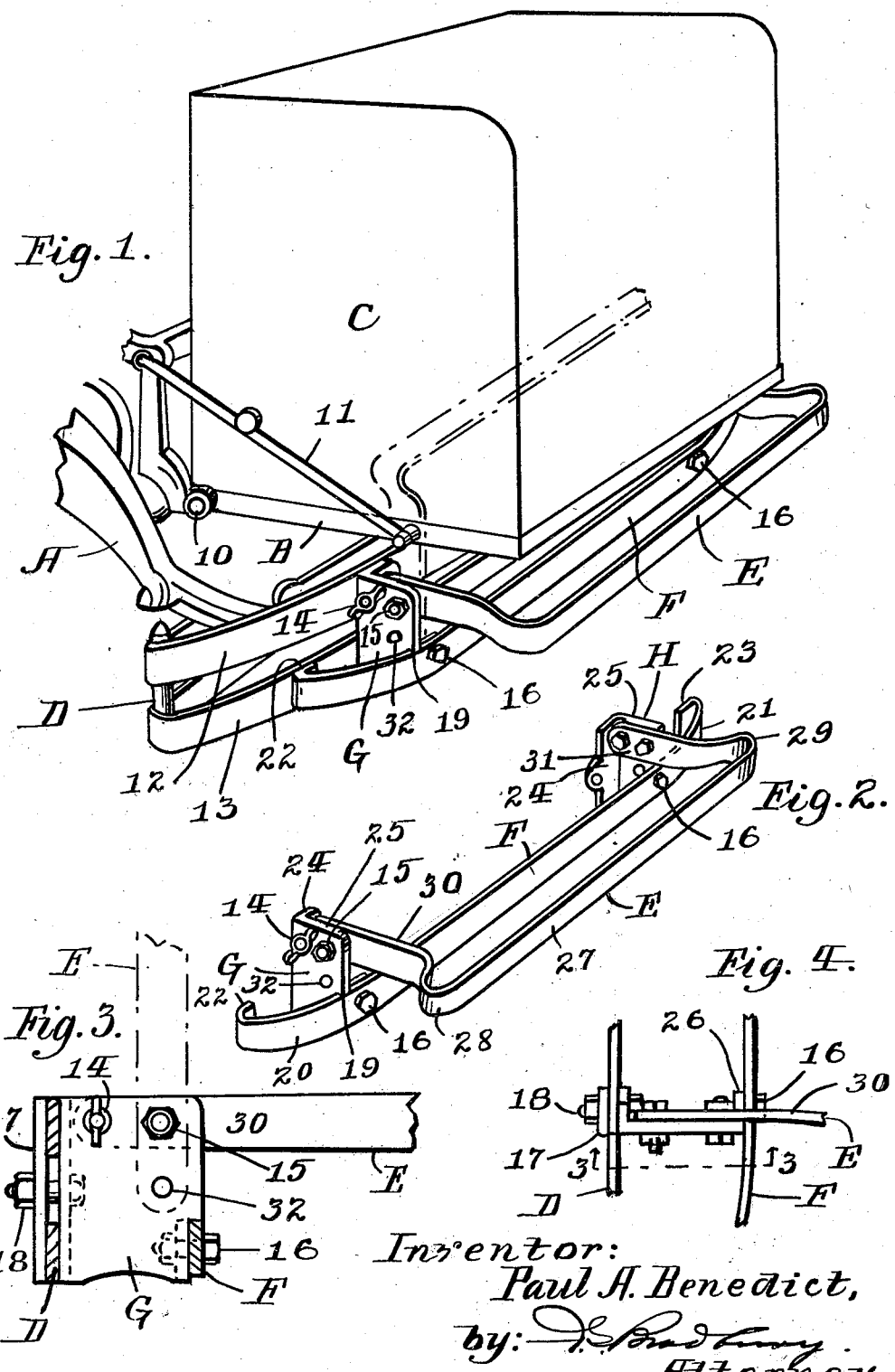

Inventor:
Paul A. Benedict
by: *[signature]*
Attorney,

Patented Oct. 21, 1930

1,778,788

UNITED STATES PATENT OFFICE

PAUL A. BENEDICT, OF LOS ANGELES, CALIFORNIA

TRUNK-RACK GUARD

Application filed July 22, 1929. Serial No. 380,206.

The usual bumper which is used on the rear ends of some makes of automobiles, does not extend rearwardly sufficiently to protect against an automobile approaching from the rear, colliding with and damaging the rack and the trunk or other luggage carried thereon and it is the primary object of this invention to provide an auxiliary trunk rack guard which co-operates with the usual bumper to reduce this hazard and damage. A further object is to provide a guard of said type which can be folded back out of the way when a trunk or other article is not carried and the usual rack swung up. Still further objects are simplified construction and greater effectiveness in use.

Figure 5:
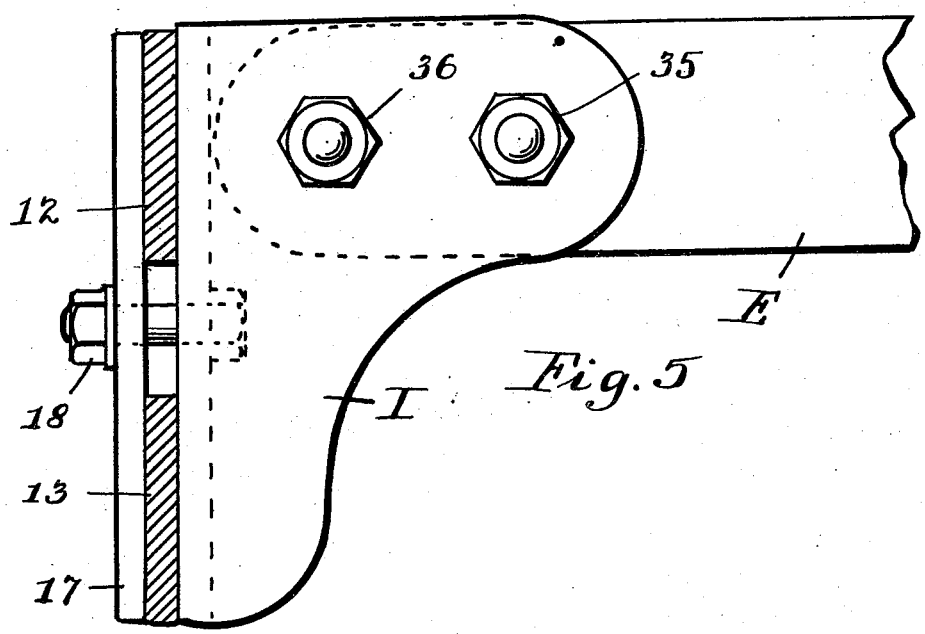
Figure 6:
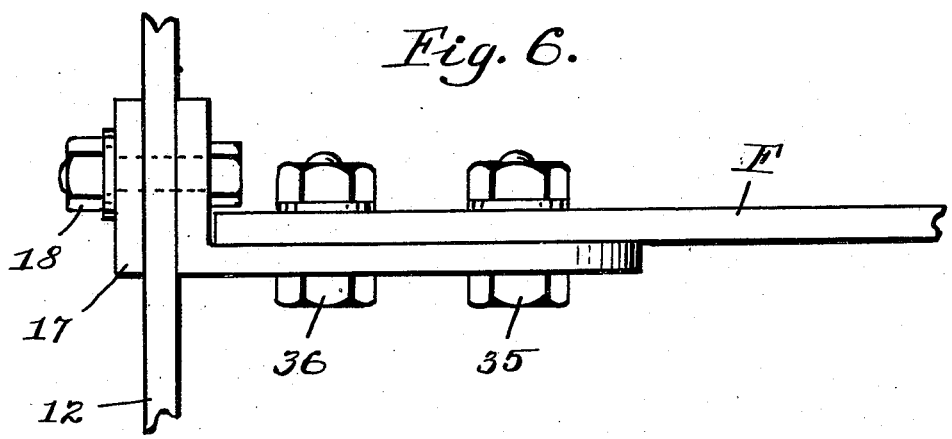

In the accompanying drawings forming part of this specification, Fig. 1 is a perspective view of a portion of the rear end of an automobile equipped with my improvement when in use; Fig. 2 is a perspective view of my improved trunk rack guard in readiness to be applied to an automobile for use; Fig. 3 is an end elevation of the structure shown in Fig. 2, when applied to the usual automobile bumper, the lower guard member of my improved device and the members of the usual bumper being shown in section on the line 3—3 of Fig. 4; Fig. 4 is a plan of a detail portion of the structure shown in Fig. 3; Fig. 5 is a side elevation of a portion of an alternative construction of my invention, and Fig. 6 is a plan of the structure shown in Fig. 5.

In the drawings, A indicates a detail portion of the rear end of the chassis of an automobile on which is hinged at 10 to fold up in the usual manner, a horizontal trunk rack B, said rack being supported by the usual foldable arms such as 11. This rack is shown carrying a trunk C but is adapted to carry any other luggage desired. Also mounted upon said chassis is the usual main bumper or guard D, which may be of any construction desired, that shown having a pair of horizontal, vertically spaced spring guards 12 and 13, which extend transversely below the trunk rack, when the latter is turned down into the position shown in Fig. 1. It will be noted that when the rack is in the position just noted it extends rearwardly from the main bumper and is not protected thereby, it and the trunk or other luggage which it carries being exposed and subject to collision from the rear without any protection.

My invention provides an auxiliary guard or bumper which extends rearwardly from and protects the trunk rack and which can be folded back out of the way when the rack is not used to perform its function. This auxiliary guard as shown consists of two spring horizontal guard members E and F, the member E being hinged and fastened to each member of a pair of brackets G and H by the bolts 14 and 15 and the supplemental member F being rigidly secured to each member of a pair of brackets by a bolt 16. These brackets are adapted to be secured to the back faces of the body portion of the spring guards 12 and 13 near the opposite sides of the vehicle by the cleats 17 and bolts 18, thus holding the spring guard members E and F extending across the rear end of the vehicle at the rear of the usual guard or bumper D and with the upper member E extending back of the rack B in a position protecting said rack and the trunk or luggage which it carries against collision from the rear. Each bracket G or H consists of a vertically disposed angle plate, the front or transverse side 24 of which is secured by said bolt 18 to the members 12 and 13 of the bumper D and the out or longitudinal side 25 of which is formed with an inturned flange 26 to which flange said bolt 16 is secured, and with a notch 19 to receive and assist in holding the supplemental or lower guard member F firmly in place. The opposite ends 20 and 21 of supplemental guard member F are bent rearwardly and are turned inwardly at 22 and 23 to form bearings against the rear face of the lower member 13 of the main bumper.

In this manner a rigid structure is produced on the main bumper D which forms a substantial structure for supporting the foldable auxiliary guard member E. Said foldable guard member has a horizontal lateral body portion 27 formed at its opposite ends with a pair of loops 28 and 29, terminating in a pair of forwardly extending arms 30 and 31, the ends of which are secured rigidly to support the guard member E in substantially horizontal position by pairs of said bolts 14 and 15, when said guard member is extended for use to protect the trunk rack. When it is desired to fold the auxiliary guard member up into the broken line position (see Fig. 1) after the trunk rack has been turned back and its use discontinued, the bolts 14 in the opposite bracket members are removed and said guard member is swung up on the bolts 15 as pivots. When in superior (broken line) position, the bolts 14 are reinserted through the arms 30 and 31 and bolt receiving openings 32 in said brackets to hold the auxiliary guard member E raised. When the upper auxiliary guard member E is in superior position the lower supplemental guard member acts as an auxiliary bumper on the main bumper D.

In the alternative construction the auxiliary spring guard member E is rigidly secured to the bracket members such as I (see Figs. 5 and 6) by the pairs of bolts such as 35 and 36, said bracket members being in turn secured to the main bumper D in the same manner as above described by the cleat 17 and bolt 18 for each bracket. The spring guard member E is adapted to perform the same function in both the preferred and alternative structures only in the alternative construction it does not swing up nor is the lower auxiliary spring guard F described above employed.

Further changes and modifications in details of construction are contemplated within the spirit of my invention.

I claim:

1. In combination with an automobile chassis having a luggage carrying rack on its rear end and a main bumper across said chassis and below said rack, an auxiliary guard across said rear end and extending rearwardly beyond said rack to protect the latter and its load from rear end collision.

2. In combination with an automobile chassis having a luggage carrying rack on its rear end and a main bumper across said chassis and below said rack, said rack being foldably supported to turn forwardly, and auxiliary guard across said rear end and extending rearwardly beyond said rack to protect the latter when turned down against rear end collision, said auxiliary guard being foldable upwardly when said rack is turned forwardly.

3. In combination with an automobile chassis having a luggage carrying rack on its rear end and a main bumper across said chassis and below said rack, said rack being foldably supported to turn forwardly, an auxiliary guard across said rear end and extending rearwardly beyond said rack to protect the latter when turned down against rear end collision, and a pair of brackets adapted to be secured to said main bumper and upon which said auxiliary guard is foldable upwardly when said rack is turned forwardly.

4. In combination with an automobile chassis having a luggage carrying rack on its rear end and a main bumper across said chassis and below said rack, said rack being foldably supported to turn forwardly, an auxiliary guard across said rear end and extending rearwardly beyond said rack to protect the latter when turned down against rear end collision, a pair of brackets adapted to be secured to said main bumper and upon which said auxiliary guard is hinged to fold upwardly when said rack is turned forwardly and a supplemental auxiliary guard across said rear end and rigidly secured to said brackets below said foldable auxiliary guard.

In witness whereof, I have signed my name to this specification.

PAUL A. BENEDICT.